(12) United States Patent
Mannheim Astete et al.

(10) Patent No.: US 12,377,638 B2
(45) Date of Patent: Aug. 5, 2025

(54) SWITCHABLE LAMINATE WITH TOUCH CONTROL

(71) Applicant: AGP America S.A., Ciudad de Panama (PA)

(72) Inventors: Mario Arturo Mannheim Astete, Lima (PE); Raghu K. Pendyala, Lima (PE); Andrés Moscoso, Lima (PE)

(73) Assignee: AGP America S.A., Panama (PA)

( * ) Notice: Subject to any disclaimer, the term of this patent is extended or adjusted under 35 U.S.C. 154(b) by 418 days.

(21) Appl. No.: 17/758,873

(22) PCT Filed: Jan. 14, 2021

(86) PCT No.: PCT/IB2021/050269
§ 371 (c)(1),
(2) Date: Jul. 14, 2022

(87) PCT Pub. No.: WO2021/144739
PCT Pub. Date: Jul. 22, 2021

(65) Prior Publication Data
US 2023/0031090 A1 Feb. 2, 2023

Related U.S. Application Data

(60) Provisional application No. 62/961,047, filed on Jan. 14, 2020.

(51) Int. Cl.
*G02F 1/133* (2006.01)
*B32B 17/10* (2006.01)
*E06B 9/24* (2006.01)

(52) U.S. Cl.
CPC .. *B32B 17/10036* (2013.01); *B32B 17/10137* (2013.01); *B32B 17/10504* (2013.01); *B32B 17/10532* (2013.01); *B32B 2307/10* (2013.01); *B32B 2457/16* (2013.01); *B32B 2457/208* (2013.01); *B32B 2605/08* (2013.01); *E06B 2009/2464* (2013.01)

(58) Field of Classification Search
CPC ......... G02F 1/133; G02F 1/0316; G02F 1/676
See application file for complete search history.

(56) References Cited

U.S. PATENT DOCUMENTS

2020/0070478 A1\* 3/2020 Weber .................. H03K 17/962

\* cited by examiner

*Primary Examiner* — Joseph P Martinez
(74) *Attorney, Agent, or Firm* — The Morales Law Firm; Joseph L. Morales, Esq.

(57) ABSTRACT

Automotive glazing, with electrically controlled light transmittance, has been available for a number of years. Growth has been steady as the public recognizes the added utility provided. While a number of means of implementation are in use, all require a set of electrodes spanning opposite faces of the switchable portion of the glazing. As automotive electronic content has proliferated and the glazed area of the vehicle has increased, it is becoming more and more of a problem finding a suitable location for the controls, for the switchable glazing as well as for other functions. By structuring the electrodes, touch sensitive regions can be formed on the laminate and utilized for control.

14 Claims, 5 Drawing Sheets

SWITCHABLE LAMINATE WITH TOUCH CONTROL

FIELD OF THE INVENTION

The invention relates to the field of laminated automotive glazing with variable light transmittance and touch control.

BACKGROUND OF THE INVENTION

We have seen a number of trends develop in the automotive industry over the last several years. One of the primary ones has been the proliferation of electronic content. The electronic content of vehicles has grown at a higher rate than any other categories of technology.

Whereas it used to be that when a button was pushed or a switch was thrown, the contacts of the button or switch were directly connected to the actual device being controlled. Today, it is more likely that the button or switch is sending a message over a network to a controller telling it to update the state of the actual device under control.

Nowadays, most vehicles are equipped with multiple computers, sensors, communication, entertainment, safety and other electronic devices running hundreds of millions of lines of software.

Even the glazing has electronic content. Many automotive windows also function as complex antenna systems. Displays are being incorporated into automotive windshields to support applications ranging from display of basic instrument panel information to navigation and even augmented reality.

One of the newer and less commercialized but growing technologies is that of variable light transmittance. On windows so equipped, the level of tint can be controlled electronically over a wide range.

One thing that all of this electronic content has in common is that there needs to be some sort of interface. That has become more and more of a problem due in part to a second trend, the increase in the total glazed area of the vehicle.

As the industry has worked to meet government mandated regulations for fuel efficiency and emissions, weight reduction has been an important task. Towards that end, heavier materials have been replaced by lighter materials. Often times a significant reduction can be achieved by increasing the size of a vehicle opening, replacing the displaced metal with glass.

We have also seen a reduction in the average size of vehicles. Decreasing the passenger compartment volume can lead to an unpleasant claustrophobic effect on the occupants. To counter this, the glazed area has been increased. The increase in vision area and natural light tends to give the cabin a less confined and larger feel.

One of the problems resulting from the increase in the glazed area is that less interior surface area is left to mount traditional devices and controls. To retain a center mount dome light on a panoramic roof, as an example, the lighting fixture must be mounted to the glass and a wire cover is needed to cover the wires feeding the light.

Progress has been made to embedded solid-state lighting inside of laminates. Thus, the dome light and lights in other locations can now be integrated as a permanent part of a laminate such as a panoramic roof.

The problem with this approach is in area of control. With the light source embedded in the glazing, where can the on/off/dimmer control be located that is convenient, intuitive and cost effective? Touch control would appear to be an obvious choice, but implementation is expensive and difficult due to the limitations on what can fit between the two layers of glass while still allowing the laminate to provide undistorted vision. Methods attempted to date have included embedding wires in the laminate and embedding sensors along the periphery of the glazing hidden by the black print.

It would be advantageous to have a glazing integrated cost-effective means to provide for control of the electronic content of the vehicle.

BRIEF SUMMARY OF THE INVENTION

The present invention has the objective of providing a variable light transmittance automotive glazing with integrated touch sensor that is cost-effective, can be embedded in any convenient location in the glazing and is aesthetically pleasing.

The invention comprises an automotive glazing equipped with variable light transmittance technology, wherein one or both of the electrode layers are structured such that an area is formed that can be used as a capacitive touch sensor and optionally remain switchable.

In this sense the automotive laminate of this invention comprises an outer and an inner glass layers, and at least one switchable film bonded to the glass layers using at least two plastic bonding layers, one on each side. The switchable film layer has a set of opposite facing electrode layers separated by a thin dielectric layer, wherein at least one portion of at least one electrode layer is electrically isolated at direct current from the remaining portion of the electrode layer. The isolated portion is also provided with an electrical connection means. A controlling means is electrically connected to said at least one isolated portion by means of the electrical connection means, wherein a user contact with said at least one isolated portion causes a change in capacitance detected by the controlling means which produce a control response. Advantages of the automotive glazing system disclosed in this invention is summarized below.

Integrated control
Lighter than conventional switches
Reduced part count
Intuitive operation
Differentiates product
Adds a high-tech look and feel
Lower cost

BRIEF DESCRIPTION OF THE SEVERAL VIEWS OF THE DRAWINGS

These features and advantages of the present invention will become apparent from the detailed description of the following embodiments in conjunction with the accompanying drawings, wherein.

REFERENCE NUMERALS OF DRAWINGS

2 Glass
4 Bonding/Adhesive Layer (interlayer)

6 Obscuration/Black Frit
8 Electrode
10 Plastic substrate
12 Film
14 Active material
18 Coating
20 Cut in electrode
22 Emulsion
24 Busbar
26 Connector
101 Surface one
102 Surface two
103 Surface three
104 Surface four
201 Outer layer
202 Inner layer

DETAILED DESCRIPTION OF THE INVENTION

The following terminology is used to describe the laminated glazing of the invention.

The term "glass" can be applied to many organic and inorganic materials, include many that are not transparent. For this document we will only be referring to nonorganic transparent glass. From a scientific standpoint, glass is defined as a state of matter comprising a non-crystalline amorphous solid that lacks the ordered molecular structure of true solids. Glasses have the mechanical rigidity of crystals with the random structure of liquids.

Glass is formed by mixing various substances together and then heating to a temperature where they melt and fully dissolve in each other, forming a miscible homogeneous fluid.

The types of glass that may be used include but are not limited to the common soda-lime variety typical of automotive glazing as well as aluminosilicate, lithium aluminosilicate, borosilicate, glass ceramics, and the various other inorganic solid amorphous compositions which undergo a glass transition and are classified as glass included those that are not transparent. The glass layers may be comprised of heat absorbing glass compositions as well as infrared reflecting and other types of coatings.

Laminates, in general, are articles comprised of multiple sheets of thin, relative to their length and width, material, with each thin sheet having two oppositely disposed major faces and typically of relatively uniform thickness, which are permanently bonded to one and other across at least one major face of each sheet.

Figure 1A:
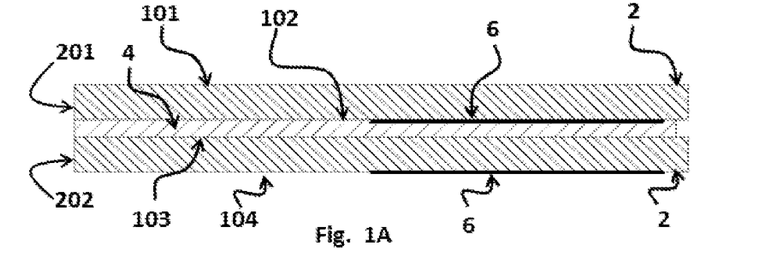
FIG. 1A shows a cross section: typical laminated automotive glazing.
Figure 1B:
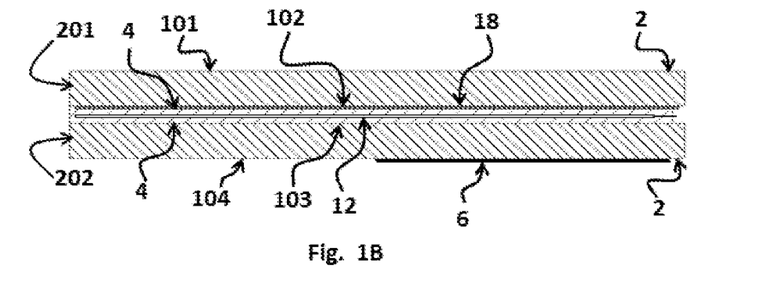
FIG. 1B shows a cross section: typical laminated automotive glazing with performance film and coating.

Laminated safety glass is made by bonding two sheets (201 & 202) of annealed glass 2 together using a plastic bonding layer comprised of a thin sheet of transparent thermoset plastic 4 (interlayer) as shown in FIGS. 1A and 1B.

Annealed glass is glass that has been slowly cooled from the bending temperature down through the glass transition range. This process relieves any stress left in the glass from the bending process. Annealed glass breaks into large shards with sharp edges. When laminated glass breaks, the shards of broken glass are held together, much like the pieces of a jigsaw puzzle, by the plastic layer helping to maintain the structural integrity of the glass. A vehicle with a broken windshield can still be operated. The plastic bonding layer 4 also helps to prevent penetration by objects striking the laminate from the exterior and in the event of a crash occupant retention is improved. Typical automotive laminated glazing cross sections are illustrated in FIGS. 1A and 1B. A laminate is comprised of two layers of glass, the exterior or outer layer 201 and the interior or inner layer 202 that are permanently bonded together by a plastic bonding layer 4 (interlayer). In a laminate, the glass surface that is on the exterior of the vehicle is referred to as surface one 101 or the number one surface. The opposite face of the exterior glass layer 201 is surface two 102 or the number two surface. The glass 2 surface that is on the interior of the vehicle is referred to as surface four 104 or the number four surface. The opposite face of the interior layer of glass 202 is surface three 103 or the number three surface. Surfaces two 102 and three 103 are bonded together by the plastic bonding layer 4. An obscuration 6 may be also applied to the glass. Obscurations are commonly comprised of black enamel frit printed on either the number two 102 or number four surface 104 or on both. The laminate may have a coating 18 on one or more of the surfaces. The laminate may also comprise a film 12 laminated between at least two plastic bonding layers 4.

Figure 1C:
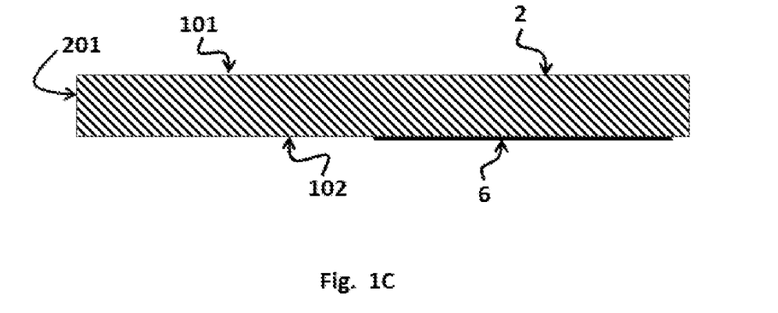
FIG. 1C shows a cross section: typical tempered monolithic automotive glazing.
Figure 2:
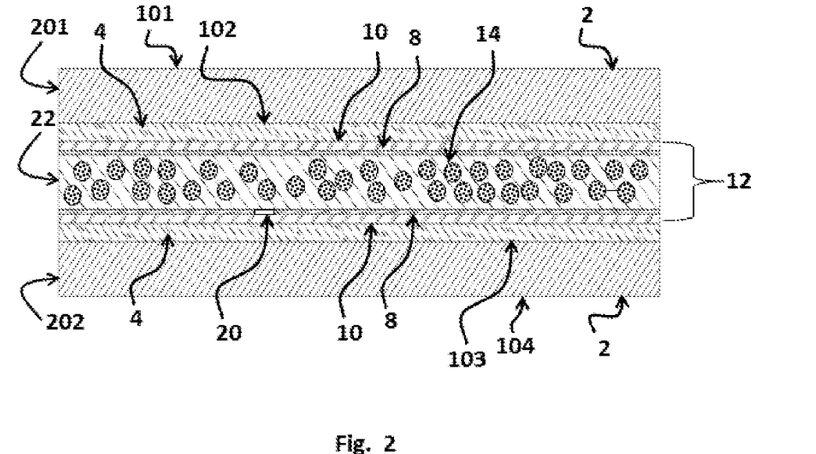
FIG. 2 shows a cross section: SPD/PDLC film laminate.
Figure 3:
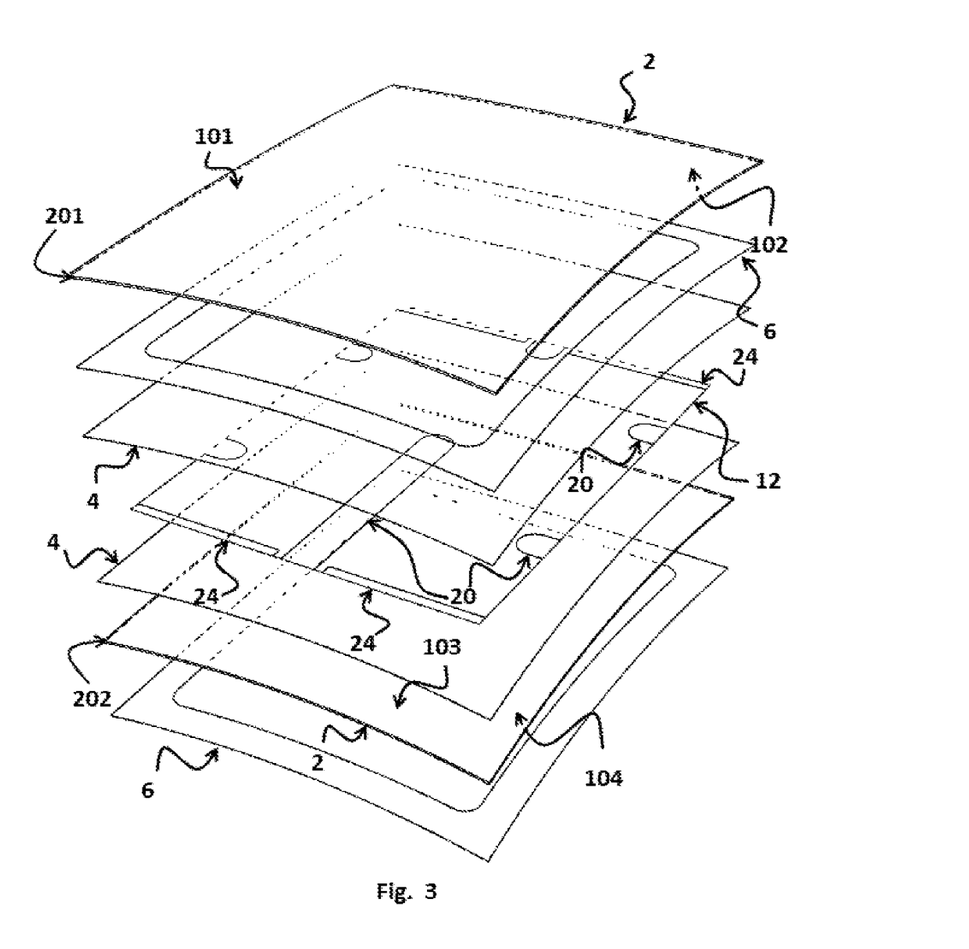
FIG. 3 shows an exploded view: panoramic roof.
Figure 4:
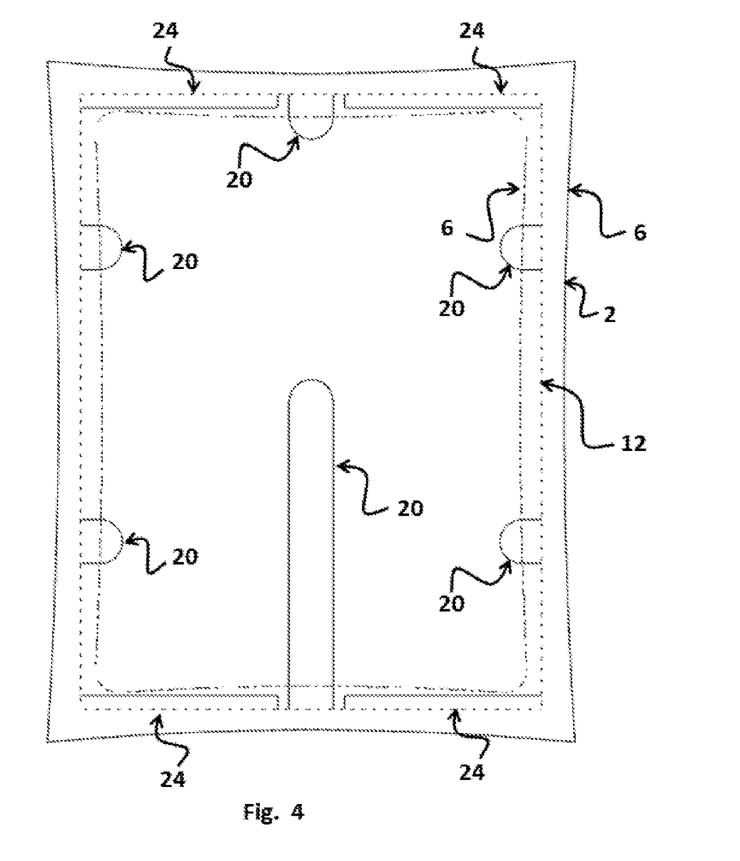
FIG. 4 shows a top view: panoramic roof.
Figure 5:
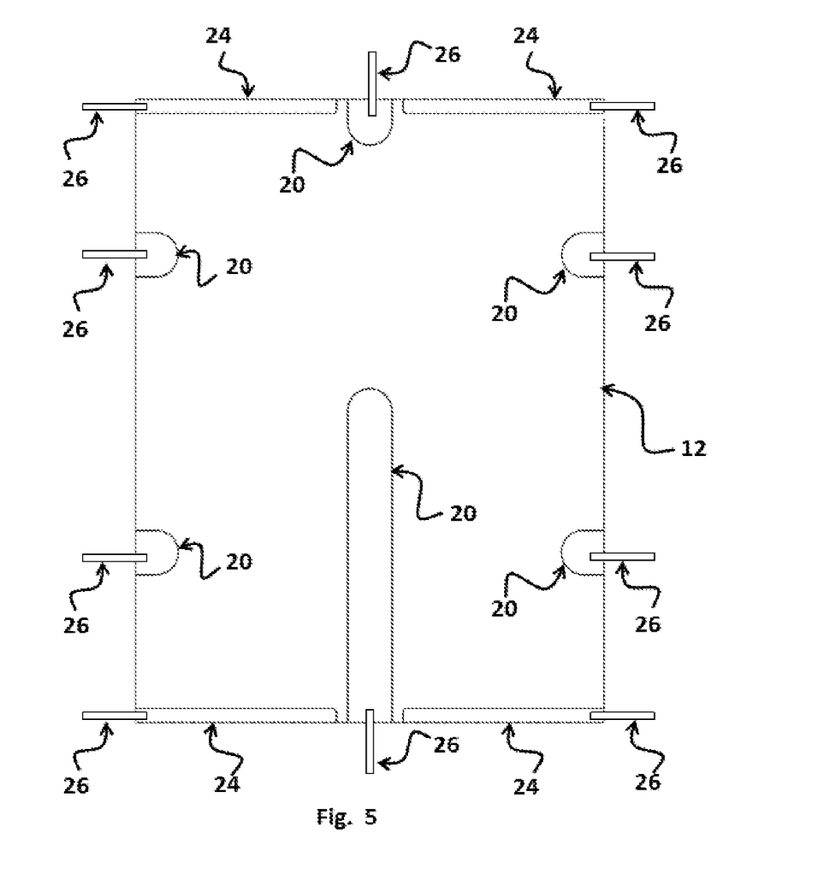
FIG. 5 shows a switchable film with structured electrode.

FIG. 1C shows a typical tempered automotive glazing cross section. Tempered glazing is typically comprised of a single layer of glass 201 which has been heat strengthened. The glass surface that is on the exterior of the vehicle is referred to as surface one 101 or the number one surface. The opposite face of the exterior glass layer 201 is surface two 102 or the number two surface. The number two surface 102 of a tempered glazing is on the interior of the vehicle. An obscuration 6 may be also applied to the glass. Obscurations are commonly comprised of black enamel frit printed on the surface two 102. The glazing may have a coating 18 on the surface one 101 and/or surface two 102.

The plastic bonding layer 4 (interlayer) has the primary function of bonding the major faces of adjacent layers to each other. The material selected is typically a clear thermoset plastic.

For automotive use, the most commonly used plastic bonding layer 4 (interlayer) is polyvinyl butyral (PVB). PVB has excellent adhesion to glass and is optically clear once laminated. It is produced by the reaction between polyvinyl alcohol and n-butyraldehyde. PVB is clear and has high adhesion to glass. However, PVB by itself, it is too brittle. Plasticizers must be added to make the material flexible and to give it the ability to dissipate energy over a wide range over the temperature range required for an automobile. Only a small number of plasticizers are used. They are typically linear dicarboxylic esters. Two in common use are di-n-hexyl adipate and tetra-ethylene glycol di-n-heptanoate. A typical automotive PVB interlayer is comprised of 30-40% plasticizer by weight.

In addition to polyvinyl butyl, ionoplast polymers, ethylene vinyl acetate (EVA), cast in place (CIP) liquid resin and thermoplastic polyurethane (TPU) can also be used. Automotive interlayers are made by an extrusion process with has a thickness tolerance and process variation. As a smooth surface tends to stick to the glass, making it difficult to position on the glass and to trap air, to facilitate the handling of the plastic sheet and the removal or air (deairing) from the laminate, the surface of the plastic is normally embossed contributing additional variation to the sheet. Standard thicknesses for automotive PVB interlayer at 0.38 mm and 0.76 mm (15 and 30 mil).

Interlayers are available with enhanced capabilities beyond bonding the glass layers together. The invention may include interlayers designed to dampen sound. Such interlayers are comprised whole or in part of a layer of plastic that is softer and more flexible than that normally used. The interlayer may also be of a type which has solar attenuating properties.

A wide variety of films are available that can be incorporated into a laminate. The uses for these films include but are not limited to: solar control, variable light transmission, increased stiffness, increased structural integrity, improved penetration resistance, improved occupant retention, providing a barrier, tint, providing a sunshade, color correction, and as a substrate for functional and aesthetic graphics. The term "film" shall include these as well as other products that may be developed or which are currently available which enhance the performance, function, aesthetics or cost of a laminated glazing. Most films do not have adhesive properties. To incorporate into a laminate, sheets of plastic interlayer are needed on each side of the film to bond the film to the other layers of the laminate.

Infrared reflecting coatings 18 (FIG. 1B) include but are not limited to the various metal/dielectric layered coatings applied through Magnetron Sputtered Vacuum Deposition (MSVD) as well as others known in the art that are applied via pyrolytic, spray, controlled vapor deposition (CVD), dip and other methods.

The glass layers are formed using gravity bending, press bending, cold bending or any other conventional means known in the art. In the gravity bending process, the glass flat is supported near the edge of glass and then heated. The hot glass sags to the desired shape under the force of gravity. With press bending, the flat glass is heated and then bent on a full of partial surface mold. Air pressure and vacuum are often used to assist the bending process. Gravity and press bending methods for forming glass are well known in the art and will not be discussed in detail in the present disclosure.

Cold bending is a relatively new technology. As the name suggest, the glass is bent, while cold to its final shape, without the use of heat. On parts with minimal curvature a flat sheet of glass can be bent cold to the contour of the part. This is possible because as the thickness of glass decreases, the sheets become increasingly more flexible and can be bent without inducing stress levels high enough to significantly increase the long-term probability of breakage. Thin sheets of annealed soda-lime glass, in thicknesses of about 1 mm, can be bent to large radii cylindrical shapes (greater than 6 m). When the glass is chemically, or heat strengthened the glass can endure much higher levels of stress and can be bent along both major axes. The process is primarily used to bend chemically tempered thin glass sheets (<=1 mm) to shape.

Cylindrical shapes can be formed with a radius in one direction of less than 4 meters. Shapes with compound bend, that is curvature in the direction of both principle axis can be formed with a radius of curvature in each direction of as small as approximately 8 meters. Of course, much depends upon the surface area of the parts and the types and thicknesses of the substrates.

The cold bent glass will remain in tension and tend to distort the shape of the bent layer that it is bonded to. Therefore, the bent layer must be compensated to offset the tension. For more complex shapes with a high level of curvature, the flat glass may need to be partially thermally bent prior to cold bending.

The glass to be cold bent is placed with a bent to shape layer and with a bonding layer placed between the glass to be cold bent and the bent glass layer. The assembly is placed in what is known as a vacuum bag. The vacuum bag is an airtight set of plastic sheets, enclosing the assembly and bonded together in the edges, which allows for the air to be evacuated from the assembly and which also applies pressure on the assembly forcing the layers into contact. The assembly, in the evacuated vacuum bag, is then heated to seal the assembly. The assembly is next placed into an autoclave which heats the assembly and applies high pressure. This completes the cold bending process as the flat glass at this point has conformed to the shape of the bent layer and is permanently affixed. The cold bending process is very similar to a standard vacuum bag/autoclave process, well known in the art, except for having an unbent glass layer added to the stack of glass.

The glass layers may be annealed or strengthened. There are two processes that can be used to increase the strength of glass. They are thermal strengthening, in which the hot glass is rapidly cooled (quenched) and chemical tempering which achieves the same effect through an ion exchange chemical treatment.

Heat strengthened, full temper soda-lime float glass, with a compressive strength in the range of at least 70 MPa, can be used in all vehicle positions other than the windshield. Heat strengthened (tempered) glass has a layer of high compression on the outside surfaces of the glass, balanced by tension on the inside of the glass which is produced by the rapid cooling of the hot softened glass. When tempered glass breaks, the tension and compression are no longer in balance and the glass breaks into small beads with dull edges. Tempered glass is much stronger than annealed laminated glass. The thickness limits of the typical automotive heat strengthening process are in the 3.2 mm to 3.6 mm range. This is due to the rapid heat transfer that is required. It is not possible to achieve the high surface compression needed with thinner glass using the typical blower type low pressure air quenching systems.

In the chemical tempering process, ions in and near the outside surface of the glass are exchanged with ions that are larger. This places the outer layer of glass in compression. Compressive strengths of up to 1,000 MPa are possible. The typical methods involved submerging the glass in a tank of molten salt where the ion exchange takes place. The glass surface must not have any paint or coatings that will interfere with the ion exchange process.

Anything to be laminated between the two glass layers must have a maximum thickness of no more than the thickness of the plastic interlayer layers in total. As a general rule, to laminate without modification of the interlayer, the object must be no more than one third of the total thickness of the plastic interlayers. If the insert is too thick, a portion of the plastic must be removed, or a thicker or additional plastic layer must be added. During the lamination process, the laminate is treated with heat and pressure. At the higher temperatures and pressure, the plastic interlayer will melt and flow to accommodate the thickness of the insert. The type of interlayer and thickness, the type and thickness of the glass, the composition and shape of the object, the shape of the part and other variables are all factors.

To control the level of light transmission through the laminate, there are many technologies available: electrochromic, photochromic, thermochromic and electric field sensitive films which are designed to be incorporated into laminated glass. Of interest are suspended particle device (SPD) films and polymer dispensed liquid crystal (PDLC) films which can quickly change their light transmittance in response to an electrical field. Laminates that incorporate these variable light transmittance technologies are sometimes referred to as "smart" glass or switchable.

SPD is a variable tint technology with which the level of tint can be controlled and varied in response to an applied electrical field. SPD goes from dark in the off state to less dark in the on state when an AC voltage is applied to the film. In an SPD film, microscopic droplets of liquid containing needle like particles, light valves, are suspended in a matrix. In the off state the particles are in a random state of alignment and block the transmission of light. The degree of alignment and resulting tint can be varied in response to the applied voltage. The light transmittance in the on and off states can also be shifted through changes to the thickness and composition of the active material. In the off state, it is still possible to see through SPD if it is designed to do so.

SPD glazing is produced by adding a special film to a laminate. The typical construction of the film is comprised of the active material sandwiched between two thin plastic layers having a transparent conductive coating on each. The film is laminated in between two plastic bonding interlayer layers to form a laminated glazing.

PDLC is a light scattering technology which goes from opaque in the off state to clear in the on state when an AC voltage is applied to the film. In a PDLC film, microscopic droplets of liquid crystal are suspended in a polymer matrix. In the off state the liquid crystals are in a random state of alignment and scatter the light providing privacy. In the off state, the film is substantially opaque. When an electric field is applied, the crystals align and allow light to pass. The degree of scattering can be varied by varying the amplitude of the applied voltage. The level of light transmittance in the on and off states can also be shifted by making changes to the thickness and composition of the active material. PDLC is primarily a privacy product though it can also be used for solar control as it reduces the solar energy transmitted.

SPD and PDLC typically operate in the range of 40 to 120 volts AC at 50 to 400 Hz. As the laminate already has two conductive transparent layers by virtue of inclusion of an SPD or PDLC film, the added cost to structure the electrodes so as to form touch sensitive regions is nominal, limited to just the cost of the added processing and the connectors needed. As the current required is very low and reactive, the connectors only need to be sufficient to survive the standard 50 N pull test. Due to the low current, a thin, flat flexible cable with one or multiple connections may also be utilized to provide the electrical connecting means. The flat flexible cable may be partially embedded in the laminate. Thin embedded wires may also be used to provide the connections from the touch sensitive areas to the touch detection controlling means external to the laminate. In some embodiments, an edge sealing material is applied as described in WO2020255094A1, incorporated herein by reference.

The switchable film is comprised of a set of opposite facing electrode layers such as TCO coating separated by a very thin dielectric layer, typically in the 10 to 150 micron range. While the DC resistance between the touch sensor and the rest of the film in the mega-ohm range, during operation, the film will draw 1-10 VA per square meter, purely reactive.

Structuring is done by any suitable means. The TCO coating can be mechanically scribed during manufacture of the film. In this case only one of the two TCO coating layers may be scribed. A second scribe may be done to serve as a backup. In some embodiments in the case when using mechanical structuring, an extra sealing layer is added to the switchable film stack to provide for extra protection as described in WO2020255094A1.

In some embodiments a LASER is used to ablate the transparent conductive coating of the assembled film. The coated plastic substrate is transparent in the operating range of the LASER whereas a minimum amount of the energy is absorbed. At the interface of the conductive coating and the emulsion, the energy is absorbed ablating the conductive coating. The width of the ablation cut should be sufficient to guarantee long term DC discontinuity. At a high enough frequency there will be enough capacitance between the DC isolated areas and the rest of the film that they will not be electrically isolated. However at the switchable film operating frequencies, capacitive coupling between the isolated area and the rest of the sheet is not significant. The touch sensitive portions are therefore placed on these areas that are electrically isolated from the remaining portion of the electrode at direct current. A cut width of between 20 μm and 200 μm is sufficient and at that narrow of a width, the cuts are essentially invisible under normal viewing conditions.

Multiple passes can be made to make the cut wider if needed. Also, multiple passes spaced apart and not immediately adjacent or overlapping may be used so that if one should short, there is at least one or more cuts to serve as a backup.

The isolated portions are connected to a resonate circuit. An AC signal, orders of magnitude higher in frequency than of the switchable control voltage, is applied to the isolated portion. When the touch sensitive area is in contact with or in close proximity to a finger or the hand of an occupant a capacitor-like system is formed, wherein the high dielectric of the water content of the skin causes the capacitance of the circuit to change, which is detected by a shift in the resonance of the circuit. At the higher capacitance, the impedance of the circuit is lowered allowing the applied signal to bleed off to ground.

Various software means can be used to turn the detected shift into a control output. Typically, we look not at the level but in the rate of change and duration. In this manner, intentional contact can be distinguished from incidental. Likewise, complex control actions can be implemented. This is a rather common practice. As an example, to switch a variable light transmittance glazing from light to dark or dark to light, single short duration touch may be used to toggle the last state of the light so that the touch control may function in the same intuitive manner as a switch. Touching and maintaining contact can be programmed to lower or increase the light transmittance. Note that while a resonate circuit is used as a way of detection of the change in impedance of the circuit carried out in this invention, other types of detection circuits may be employed without departing from the concept of the invention.

Unlike the typical touch screens that we are familiar with, the location on the glazing is only known to the resolution of the cut areas. If the glazing is provided with six cuts, then we only know the state of the six areas. The system is not intended to return x,y coordinate data from anywhere on the glazing.

The touch sensitive areas can be made much large than would be the case with a conventional switch or button, making it easier for the occupant to locate and operate. Light signaling can be used to indicate where the touch control is located without interfering with the touch control operation.

The location of the touch sensitive areas can be delineated for the occupant by a number of means. As surface four (the inner most surface) of the inner glass layer is most likely already going to have a black print, a black print provides a very cost-effective means of identifying the location of the touch controls. Alternately, the laminate can be illuminated along the edge of glass and a light dispersing ink can be printed on the glass. When the glass is illuminated the control locations will be clearly and aesthetically illuminated.

The touch sensitive area can be configured to switch in unison with the remainder of the film, independently or not at all. In some embodiments, the light transmittance of the touch sensitive area is set by the controlling means to the opposite of the state of the remainder of the film. In this way, the touch sensitive area is clearly delineated. The light transmittance of the film responds to the magnitude and frequency of the control signal. The capacitive detection signal can ride on the switchable signal as they are separated in frequency by orders of magnitude and the touch circuit is measuring the rate of change of the impedance rather than the amplitude of the voltage.

The cut can be made through just a single electrode layer, both or through the entire thickness of the film without departing from the intent of the invention. A cut in a single electrode is sufficient but may not always be the most efficient depending upon a number of factors such as the type of equipment available. As an example, if only a $CO_2$ LASER cutting machine is available, then it will not be possible to cut the electrode without also cutting the plastic substrate as the plastic absorbs in the frequency range of a $CO_2$. The primary drawback of cutting both is that an additional electrical connection will be needed to connect the opposite electrode rather than having just a single connection to a common reference ground for the entire sheet of film. Additionally, an extra sealing layer should be added to the switchable film stack to provide for extra protection as described in WO2020255094A1.

Applications are not limited to just those discussed or those integrated with the glazing. Virtually any of the vehicle controls can be controlled the same way.

DESCRIPTION OF EMBODIMENTS

1. Embodiment 1 is a panoramic roof and is illustrated in FIGS. 2, 3, 4 and 5. The outer glass layer 201 is comprised of 3.2 mm thick, thermally tempered, press bent, clear, soda-lime glass 2 with a MSVD solar control coating (not shown) applied to surface two 102. The inner glass layer 202 is comprised of 2.1 mm annealed press bent soda-lime glass. Two layers of 0.76 PVB plastic interlayer 4 are used to bond the glass layers, 201 and 202, to the switchable film layer 12. The switchable film layer 12 is comprised of SPD with light transmission ranging from 20% to 40% and having a thickness of 400 μm. The film electrode 8 on the surface two 102 side of the film layer 12 is connected to ground and comprises a single continuous layer. The electrode 8 on the surface three 103 side of the film layer 12 is structured (has a cut) 20 by means of LASER scribing to form six touch sensitive sensors for control of the light transmittance of the glazing and for cabin lighting. The LASER cut 20 line has a width of 100 μm. Each sensor has a diameter of 100 mm with cuts tangent to the circle and perpendicular to the edge of the film layer 12. Thin flexible connectors are partially laminated in the glass and protrude from the edge of glass to provide an electrical connection to the touch detection controlling means. Each sensor is provided with a 100 mm long 3 mm×0.050 mm copper strip with a 25 μm layer of polyamide tape insulation on each side each adhered to the other and the copper by means of a 25 μm layer of acrylic adhesive on each, wherein 6 mm from each end is left uninsulated. The connectors extend beyond the edge of glass where they are folded over and bonded to surface four 104 of the laminate after a connector has been soldered to the exposed end. The connector is added to the film layer 12 in the same way that the bus bars are added. A PET plastic substrate 10 on the ground side of the film layer 12 is cut and the PET 10 and emulsion 22 are removed exposing the electrode 8 on the LASER cut 20 electrode 8 side of the film layer 12. The exposed copper of the connector is attached to the electrode 8 using a silver filled adhesive as described in WO2020222177A1, incorporated herein by reference. The connector is covered with an acrylic adhesive backed polyamide tape, similar to that used for the connector insulation. The SPD film 12 is tested to verify that all functionality has been achieved. The film layer 12 is added during assembly of the laminate. The assembly is then processed through a standard automotive autoclave lamination cycle. Once installed in the vehicle, the laminate is electrically connected to the touch controlling means wherein the isolated sections are electrically connected to a circuit configured to detect a change in capacitance caused by user contact with said region and provide a control signal that is used to alter the state of one or more of the vehicle devices which may include but not limit the switchable glazing itself, lighting, displays and other equipment. The controller detects contact with each of the touch sensitive areas. In response, the controller sends messages over the vehicle network to the various on-board devices controlled by the touch sensitive areas.
2. Embodiment two varies from embodiment one in that the film layer 12 is structured in a way that a second cut 20 is made 1 mm inboard of the first cut 20.
3. Embodiment three varies from embodiment one in that to better delineate the touch sensitive areas on the laminate, the control automatically sets the light transmittance of the touch sensitive areas to the opposite of the remainder of the film. When the film in the dark state the touch sensitive areas are lit. When the film is lit, the touch sensitive areas are dark.
4. Embodiment four varies from embodiment one in that to further aid delineation of the control touch sensitive areas, the edges of the areas are illuminated by means of a light diffusing ink printed on surface 3 of the inner glass layer 202. The inner glass layer is illuminated along the two long edges by an LED light bar which injects light into the glass layer. The glass layer serves as a wave guide conducting the light until it reaches the light defusing ink which decouples the light illuminating the edges of the touch sensitive areas.
5. Embodiment five varies from embodiment one in that the inner glass layer is 1.0 mm chemically tempered aluminosilicate glass and it is cold bent.
6. Embodiment six varies from embodiment one in that the film is a PDLC film.
7. Embodiment seven varies from embodiment five in that the film is a PDLC film.
8. Embodiment eight varies from embodiment one in that the isolated touch sensitive areas do not change state remaining in the OFF state.
9. Embodiment nine varies from embodiment one in that the outer glass layer is 2.1 mm annealed glass and it is press bent
10. Embodiment ten varies from embodiment one that the outer glass layer is not provided with a MSVD solar control coating.
11. Embodiment eleven varies from embodiment one that the width of the structured line is less than 50 μm width.

12. Embodiment twelve varies from embodiment one that the width of the structured line is less than 20 μm width.
13. Embodiment thirteen varies from embodiment one that the switchable film has a film layer 12 with an edge sealing material.
14. Embodiment fourteen varies from embodiment thirteen that the switchable film layer 12 has an additional edge sealing material protection in the touch sensor electrode areas.
15. Embodiment fifteen varies from embodiment one that the switchable film has a mechanically structured film layer 12.

The invention claimed is:

1. An automotive laminate system comprising:
an outer glass layer;
an inner glass layer;
at least two plastic bonding layers;
at least one switchable film layer having a set of opposite facing electrode layers separated by a dielectric layer, wherein at least one portion of at least one electrode layer is electrically isolated at direct current from the remaining portion of the electrode layer,
wherein said at least one isolated portion is provided with an electrical connection means; and
a controlling means electrically connected to said at least one isolated portion by means of the electrical connection means, wherein a user contact with said at least one isolated portion causes a change in capacitance detected by the controlling means which produce a control response;
wherein said at least one isolated portion is configured to switch light transmittance independent of the remainder of the film.

2. The automotive laminate system of claim 1, wherein the control response produced by the controlling means is a change in state.

3. The automotive laminate system of claim 1, wherein the laminate is a panoramic roof.

4. The automotive laminate system of claim 1, wherein the switchable film layer is comprised of an SPD film with an edge sealing material.

5. The automotive laminate system of claim 1, wherein the switchable film layer is comprised of a PDLC film with an edge sealing material.

6. The automotive laminate system of claim 1, wherein the inner glass layer is chemically tempered.

7. The automotive laminate system of claim 1, wherein the inner glass layer is cold bent.

8. The automotive laminate system of claim 1, further comprising a solar control coating.

9. The automotive laminate system of claim 1, further comprising an acoustic control interlayer.

10. The automotive laminate system of claim 1, wherein said at least one switchable film layer is electrically controllable by the control response provided by the controlling means.

11. The automotive laminate system of claim 1, wherein the location of said at least one isolated portion is delineated for the occupant by a light diffusing means which decouples light injected into the inner glass layer by a lighting means.

12. The automotive laminate system of claim 1, wherein said at least one isolated portion is configured to switch light transmittance in unison with the remainder of the film.

13. The automotive laminate system of claim 1, wherein said at least one isolated portion does not change state remaining in the OFF state.

14. An automotive laminate system comprising:
an outer glass layer;
an inner glass layer;
at least two plastic bonding layers;
at least one switchable film layer having a set of opposite facing electrode layers separated by a dielectric layer, wherein at least one portion of at least one electrode layer is electrically isolated at direct current from the remaining portion of the electrode layer,
wherein said at least one isolated portion is provided with an electrical connection means; and
a controlling means electrically connected to said at least one isolated portion by means of the electrical connection means, wherein a user contact with said at least one isolated portion causes a change in capacitance detected by the controlling means which produce a control response;
wherein said at least one isolated portion is delineated by the action of the controlling means switching the at least one isolated portion to the opposite of the light transmittance of the remainder of the film.

* * * * *